United States Patent [19]
Endoh

[11] Patent Number: 5,818,031
[45] Date of Patent: Oct. 6, 1998

[54] BAR CODE ENCODING SYSTEM USING FOUR-STATE CODES

[75] Inventor: Naoki Endoh, Chiba-ken, Japan

[73] Assignee: Kabushiki Kaisha Toshiba, Kawasaki, Japan

[21] Appl. No.: 616,253

[22] Filed: Mar. 15, 1996

[30] Foreign Application Priority Data

Mar. 16, 1995 [JP] Japan ................................. 7-057629

[51] Int. Cl.⁶ .................................................. G06K 07/10
[52] U.S. Cl. ........................................ 235/494; 235/462
[58] Field of Search .................................. 235/462, 472, 235/469, 470, 454, 494

[56] References Cited

U.S. PATENT DOCUMENTS

| 4,743,747 | 5/1988 | Fougere et al. | 235/494 |
| 5,153,928 | 10/1992 | Iizuka | 382/65 |
| 5,479,515 | 12/1995 | Longacre | 235/463 |

FOREIGN PATENT DOCUMENTS

| 0 547 858 | 6/1993 | European Pat. Off. | |
| 5143797 | 6/1995 | Japan | 235/494 |
| WO 86 03041 | 5/1986 | WIPO | |
| WO 92 11612 | 7/1992 | WIPO | |

OTHER PUBLICATIONS

USPS Fifth Advanced Technology Conference, pp. 49–54, 1992, Richard E. Blahut, et al., "A Damage Resistant Bar Code for the Royal Mail" No month.

Automation, pp. 20–21, Sep. 1992, "Understanding The New 4–state Customer Code".

*Primary Examiner*—Donald T. Hajec
*Assistant Examiner*—Thien Minh Le
*Attorney, Agent, or Firm*—Oblon, Spivak, McClelland, Maier & Neustadt, P.C.

[57] ABSTRACT

A bar code encoding system comprising a representing unit for representing an input character by an information symbol of m bits excluding a bit pattern of all "0" bits, a calculating unit for subjecting a series of a k-number of information symbols to error-correction encoding and calculating a check symbol series of a q-number of check symbols, a converting unit for respectively converting an n=(k+q) number of symbols to predetermined bar code patterns, and arrangement converting unit for converting arrangement of the n-number of symbols so that at most three bar code patterns corresponding to the check symbols may not be consecutively arranged.

13 Claims, 10 Drawing Sheets

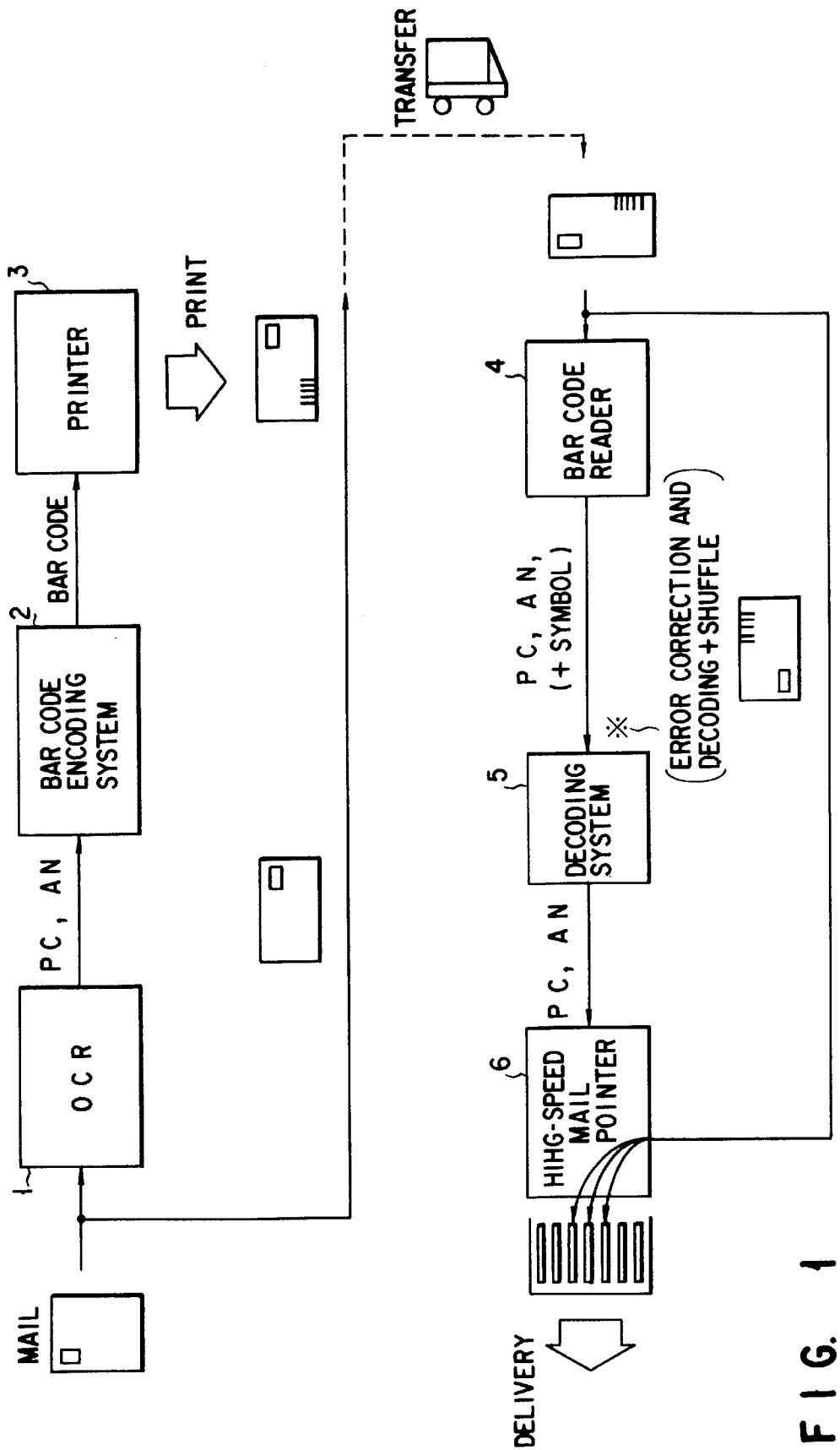
F I G. 1

| CHARACTER | BIT PATTERN | BAR CODE |
|---|---|---|
| 0 | 0001 | |
| 1 | 0010 | |
| 2 | 0011 | |
| 3 | 0100 | |
| 4 | 0101 | |
| 5 | 0110 | |
| 6 | 0111 | |
| 7 | 1000 | |

FIG. 4A

| CHARACTER | BIT PATTERN | BAR CODE |
|---|---|---|
| 8 | 1001 | |
| 9 | 1010 | |
| (HYPHEN) | 1011 | |
| CC1 | 1100 | |
| CC2 | 1101 | |
| CC3 | 1110 | |
| NULL | 1111 | |
| NONE | 0000 | |

PC CODE (UNSHUFFLED)

| 7 INFORMATION SYMBOLS | 6 CHECK SYMBOLS |
|---|---|
| IS1~IS7 | CS1~CS6 |

AN CODE (UNSHUFFLED)
THE NUMBER OF INFORMATION SYMBOLS ≧ 9

AN1: | IS1 | IS3 | IS5 | IS7 | IS9 | IS11 | IS13 | 6 CHECK SYMBOLS |   CS11~CS16
AN2: | L1 | IS2 | IS4 | IS6 | IS8 | IS10 | IS12 | 6 CHECK SYMBOLS |   CS21~CS26

THE NUMBER OF INFORMATION SYMBOLS ≦ 8

AN1: | L21 | L22 | IS1 | IS3 | IS5 | IS7 | 8 CHECK SYMBOLS |   CS11~CS18
AN2: | L31 | L32 | IS2 | IS4 | IS6 | IS8 | 8 CHECK SYMBOLS |   CS21~CS28

PC CODE (SHUFFLED)

| IS1 | CS1 | IS2 | CS2 | IS3 | CS3 | IS4 | CS4 | IS5 | CS5 | IS6 | CS6 | IS7 |

FIG. 7

AN CODE (SHUFFLED)
THE NUMBER OF INFORMATION SYMBOLES ≧ 9

AN1 | IS1 | CS11 | IS3 | CS12 | IS5 | CS13 | IS7 | CS14 | IS9 | CS15 | IS11 | CS16 | IS13 |

AN2 | L1 | CS21 | IS2 | CS22 | IS4 | CS23 | IS6 | CS24 | IS8 | CS25 | IS10 | CS26 | IS12 |

$L1 = 0101 = \vdots \vdots \vdots$

FIG. 8A

THE NUMBER OF INFORMATION SYMBOLES ≦ 8

AN1 | IS1 | CS12 | L21 | CS13 | IS1 | CS14 | IS3 | CS15 | IS5 | CS16 | IS7 | CS17 | L22 | CS18 |

AN2 | CS21 | L31 | CS22 | IS2 | CS23 | IS4 | CS24 | IS6 | CS25 | IS8 | CS26 | L32 | CS27 | CS28 |

$L21 = L22 = 10 = \vdots \vdots$
$L31 = L32 = 10 = \vdots \vdots$

FIG. 8B

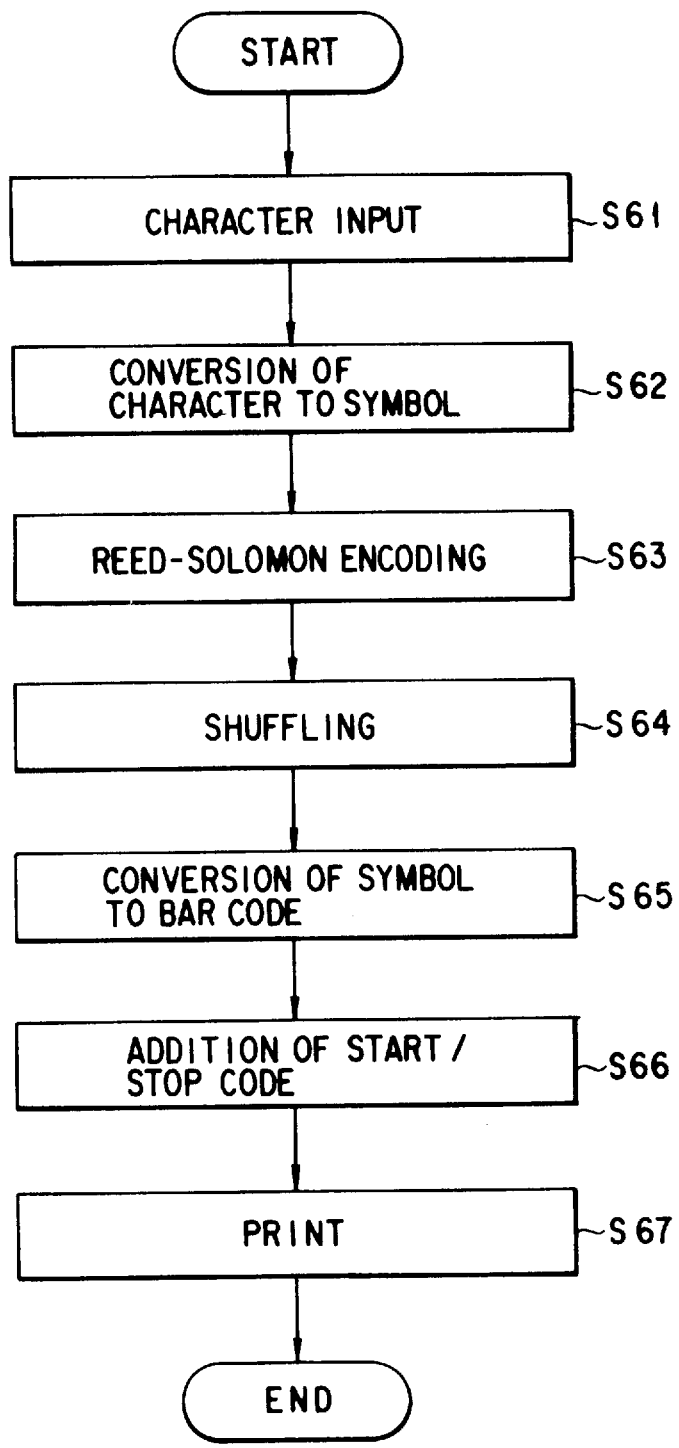
F I G. 9

BAR CODE ENCODING SYSTEM USING FOUR-STATE CODES

BACKGROUND OF THE INVENTION

1. Field of the Invention

The present invention relates to a bar code encoding system adapted for an encoding system of a mailing machine utilized to improve the efficiency of mail sorting and delivering work.

2. Description of the Related Art

To efficiently transfer and handle objects, such as a postcard or an envelope, a bar code, which incorporates information representing characteristics of the object, is printed thereon.

Delivery of mail is a suitable example to which the bar code encoding system is applicable. For example, in a central post office, a bar code having a custom-designed system, for representing information, such as a destination town and address number, is printed on one surface of a postcard. In a local post office or delivery office, the bar code is read to recognize the information on the destination town and address number. Based on the recognized information, postcards are automatically sorted in accordance with the addresses.

However, the bar code printed on a mail piece may overlap the address written by the sender, in which case, problems may arise; for example, the bar code cannot be read at all or may be erroneously read.

When such a problem arises, the address of the mail must be read again by an operator or the delivery of the mail to the correct address may delay. These problems result in high cost of the mailing system or inconvenience to the users.

SUMMARY OF THE INVENTION

An object of the present invention is to provide a bar code encoding system for encoding an error correction code, by which even if an error occurs due to the above problems, the probability of an uncorrectable error or erroneous reading can be suppressed to a minimum.

Another object of the present invention is to provide a practical automatic system for collecting and delivering objects, such as mail.

The above objects are achieved by four-state bar codes comprising the combination with:

a first code element representing a long bar having a predetermined length defined by an upper end, a center and a lower end;

a second code element representing an upper half bar having a length extending from the upper end to the center;

a third code element representing a lower half bar having a length extending from the center to the lower end; and a fourth code element representing a blank from the upper end to the lower end.

The above objects are achieved by a bar code encoding method comprising the steps of:

representing an input character by an information symbol consisting of m bits excluding a bit pattern of all "0" bits;

subjecting a series of a k-number of information symbols to error-correction encoding and calculating a check symbol series of a q-number of check symbols;

converting an n=(k+q) number of symbols to predetermined bar code patterns; and converting arrangement of the n-number of symbols so that at most three bar code patterns corresponding to the check symbols may not be consecutively arranged.

The above objects are achieved by a bar code encoding system comprising:

representing means for representing an input character by an information symbol of m bits excluding a bit pattern of all "0" bits;

calculating means for subjecting a series of a k-number of information symbols to error-correction encoding and calculating a check symbol series of a q-number of check symbols;

converting means for respectively converting an n=(k+q) number of symbols to predetermined bar code patterns; and arrangement converting means for converting arrangement of the n-number of symbols so that at most three bar code patterns corresponding to the check symbols may not be consecutively arranged.

The above objects are also achieved by a correcting and delivering system comprising:

a character reader for reading character written on an object;

a bar code encoder for encoding the character read from the object by the character reader by using four-state bar codes comprising the combination with: a first code element representing a long bar having a predetermined length and defined by an upper end, a center and a lower end; a second code element representing an upper half bar having a length extending from the upper end to the center; a third code element representing a lower half bar having a length extending from the center to the lower end; and a fourth code element representing a blank from the upper end to the lower end;

a printer for printing a bar code encoded by the bar code encoder on the object;

a bar code reader for reading the bar code printed on the object;

a decoder for decoding the bar code to restore the bar code read by the bar code reader to the character in accordance with an encoding method used in the bar code encoder; and a sorter for sorting the object based on an information corresponding to the character restored by the decoder.

With the bar code encoding system of the present invention, information of each bit (0 or 1) is represented by presence or absence of a printed portion of a bar (the whole bar, the upper half bar or the lower half bar). Since the information symbols of m bits used in the present invention excludes a symbol having a pattern of all "0" it is ensured that the bar code representing each character has at least one bar.

In addition, according to the present invention, for example, six (=n−k) check symbols are added to seven (=k) information symbols, each consisting of four (=m) bits. The known Reed-Solomon code over GF (16) is applicable to the above encoding method. With this method, the number of erroneous symbols, which are correctable, can be maximum in respect of the number of added check symbols. Therefore, the Reed-Solomon code is advantageous in improving the probability of reading the bar codes printed on the mails.

However, it is difficult to ensure that the calculated check symbol excludes a symbol having a bit pattern of all "0". If the bits of a check symbol are all "0", the bar code representing the symbol has no bars. If such a bar code is consecutively printed, the reliability of recognizing the bar code pattern is reduced, depending on the mechanical accuracy of printing or reading.

To solve the problem, according to the present invention, three or more bar code patterns, corresponding to check symbols, are not consecutively arranged. When two continuous bar code patterns corresponding to check symbols are arranged on a print surface, a bar including a printed portion is printed in either or both of the start and the end portions of the patterns. As a result, it is ensured that the length of a section in which no bar is present is limited to a predetermined value or less. Therefore, the ability of the Reed-Solomon code for correcting errors can be efficiently utilized, while the reliability of the bar-code recognition is maintained.

Further, according to the present invention, a rereading operation by the operator is not required, and the delivery delay of the mail to the correct address is prevented. Thus, the cost of the mailing system is kept low and the convenience of the users is improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic diagram for explaining the overall work of sorting and delivering mail pieces according to an embodiment of the present invention;

FIGS. 4A and 4B are diagrams showing the relationship between the input character and the corresponding bit pattern and bar code according to the above embodiment;

FIG. 5 is a diagram showing a structure of an unshuffled PC code according the above embodiment;

FIGS. 6A and 6B are diagrams showing structures of unshuffled AN codes according to the above embodiment;

FIG. 7 is a diagram showing a structure of a shuffled PC code according the above embodiment;

FIGS. 8A and 8B are diagrams showing structures of shuffled AN codes according to the above embodiment;

FIG. 9 is a flowchart showing a process of printing a PC code according to the above embodiment;

DETAILED DESCRIPTION OF THE PREFERRED EMBODIMENTS

Figure 2:
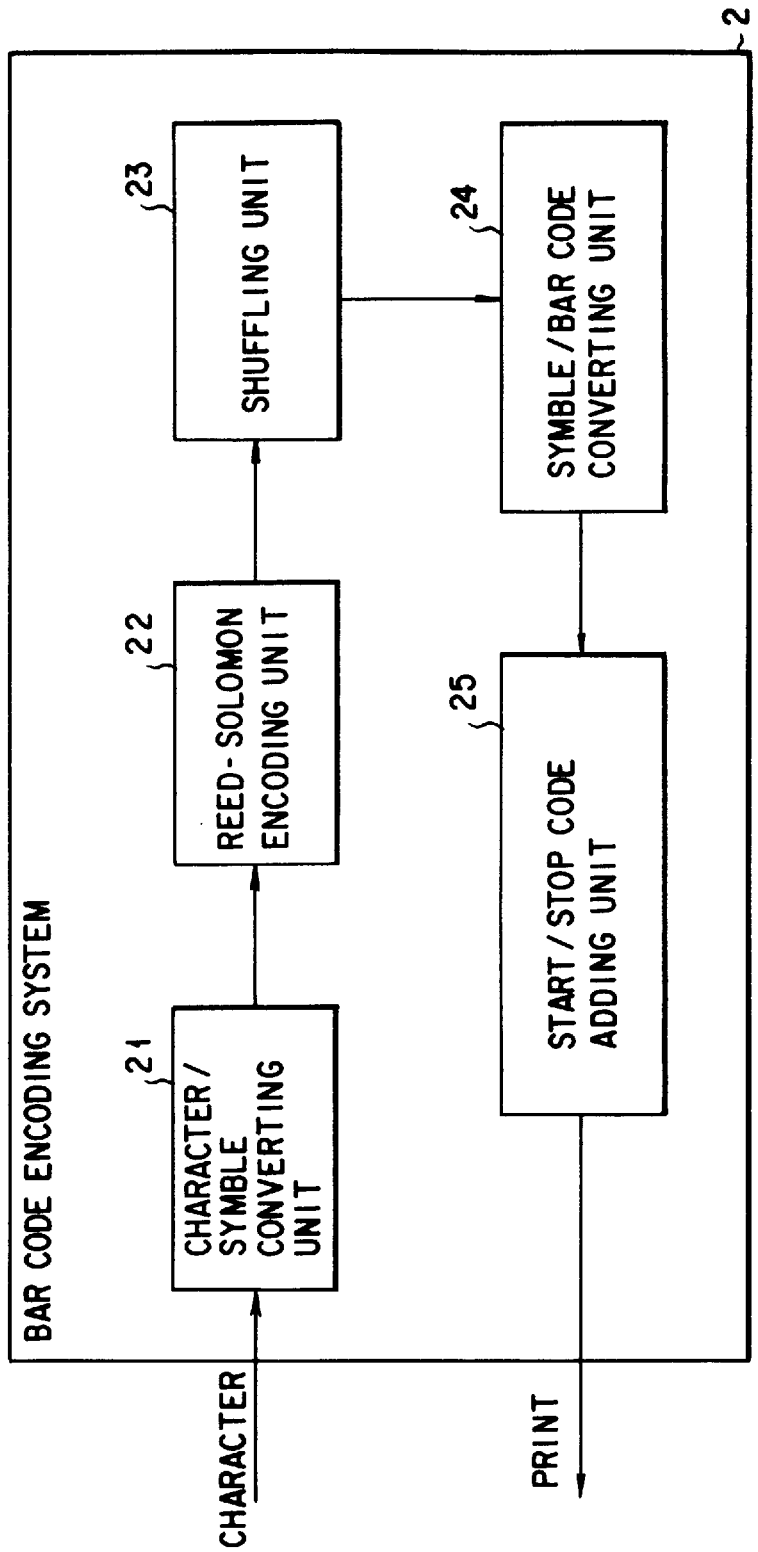
FIG. 2 is a functional block diagram showing the bar code encoding system of the above embodiment.

An embodiment, in which the present invention is applied to a mail collecting and delivering system, will be described with reference to the accompanying drawings. The present invention is not limited to the mail collecting and delivering system but is applicable to various systems for collecting and delivering a number of objects on which character information is written.

A mail collecting and delivering system according to an embodiment of the present invention has a system structure as shown in FIG. 1. Mails (e.g., postcards and envelopes), collected from various places, are processed by an OCR (optical character reader) 1, to read post codes (PCs) and address numbers (ANs) written on the mails. The PCs and ANs are input to a bar code encoding system 2, in which they are encoded to a bar code in accordance with a predetermined rule. The encoding process in the bar code encoding system 2 is the subject matter of the present invention, which will be described in detail later.

The bar code encoded by the bar code encoding system 2 is printed on a piece of mail by a printer 3.

In another office which receives the mail, the bar code is read by a bar code reader 4. At this time, it is possible that read data include an error.

A decoding system 5 executes a decoding operation including error correction. The PCs and ANs obtained by the decoding operation are supplied to a high-speed mail sorter 6. The high-speed mail sorter 6 sorts mails based on the PCs and ANs. The automation increases the efficiency of sorting mails in accordance with the addresses.

As shown in FIG. 2, the bar code encoding system 2 comprises a character/symbol converting unit 21, a Reed-Solomon encoding unit 22, a shuffling unit 23, a symbol/bar code converting unit 24 and a start/stop code adding unit 25.

The character/symbol converting unit 21 converts an input character to a combination of a predetermined number of information symbols in conformity to a rule.

For example, according to this embodiment, 15 kinds of characters (information symbols) are used; i.e., ten numerals (0–9), a hyphen, three control codes to represent Roman letters and a null code.

The three control codes (CC1–CC3) are used as follows. Ten Roman letters are represented by combining the code CC1 with the ten numerals. Further, ten Roman letters are represented by combining the code CC2 with the ten numerals. The other six Roman letters are represented by combining the code CC3 with six numerals. Thus, all the Roman letters, the numerals, the hyphen, and the blank are represented by the information symbols, so that PCs and ANs can be represented easily.

The 15 information symbols are assigned to specified bit patterns. For this purpose, it is only necessary that 15 patterns except for 0000 (i.e., 0001 to 1111), of all the 16 four-bit patterns, be used.

Figure 3:
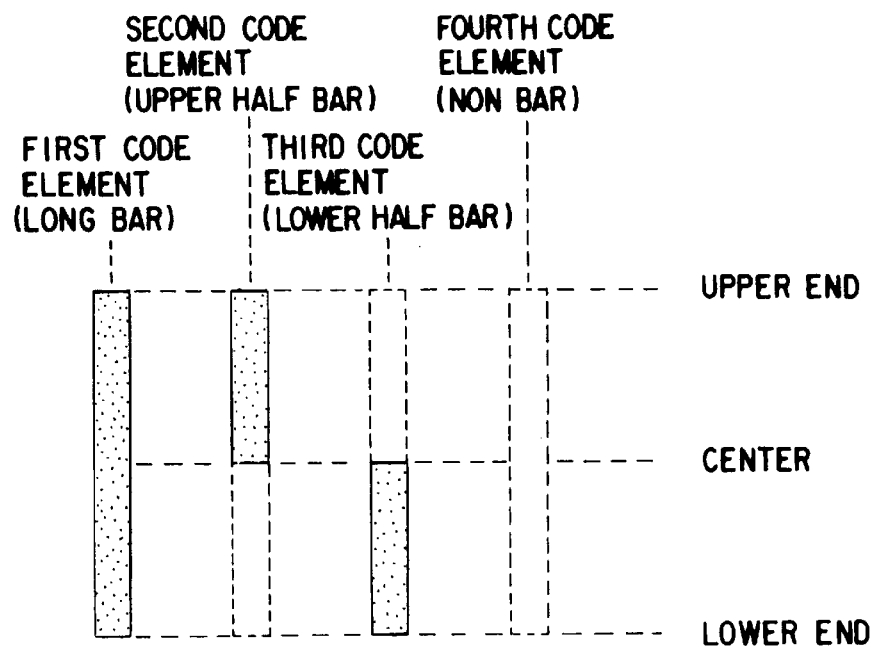
FIG. 3 is a diagram showing a bar code according to the present invention.

FIG. 3 shows an example of the bar codes, and FIGS. 4A and 4B show the relationship between the input character and the corresponding bit pattern and bar code. In this embodiment, one bar code have four states. As shown in FIG. 3, the bar code of this embodiment has first to fourth code elements: the first code element representing a long bar extending from the upper end to the lower end including the center; the second code element representing an upper half bar extending from the upper end to the center; the third code element representing a lower half bar extending from the center to the lower end; and the fourth code element is a blank from the upper end to the lower end.

One character is represented by a combination of two of the first to fourth elements. One bar represents two bits. Each symbol is represented by four bits; that is, two bars.

The Reed-Solomon encoding unit 22 executes a Reed-Solomon encoding operation to correct errors in information symbols. The aforementioned 15 bit patterns are regarded as elements of a finite set, i.e., a Galois field GF (16), closed with respect to the four rules of arithmetic. The GF (16) consists of the aforementioned 15 four-bit patterns and 0000.

When the information symbols are assigned to the elements of the Galois field, the Reed-Solomon encoding operation serves to correct errors in the information symbols. The Reed-Solomon encoding itself is well-known art, which is described in detail in, for example, "The Theory of Error-Correcting Codes" by F. J. MacWilliams and N. J. A. Soloane, pp.294–316. In this embodiment of the present invention, a PC is represented by an information symbol of 7 bits. An AN is represented by an information symbol of at most 13 bits (or less bits, depending on the address).

FIG. 5 shows a basic structure of a Reed-Solomon code of a PC. The PC includes seven information symbols (IS1–IS7) and six check symbols (CS1–CS6). The PC is a Reed-Solomon code having 13 symbols, including the seven information symbols and the six check symbols, and a minimum Hamming distance of 7. It is possible to correct errors in at most three symbols of the 13 symbols of a code.

As regards an AN, it is necessary to encode information symbols of at most 13 bits (the maximum bits which can be set as an information symbol). The information symbols of the AN are divided into two coding words. If the Reed-Solomon code on the GF(16) has the maximum length 15 and it is encoded with one coding word, a sufficient number of check symbols cannot be provided, and consequently, a sufficient correcting ability cannot be obtained. Basically, each coding word has seven information symbols and six check symbols. One code is a Reed-Solomon code having 13 symbols, including seven information symbols and six check symbols, and a minimum Hamming distance of 7. It is possible to correct errors in at most three symbols of the 13 symbols of a code.

An address number is constituted by various number of numerals. To improve the efficiency of reading codes corresponding to the addresses on the all mails, if the number of numerals of an address number is relatively small, the number of check symbols of a code can be increased, so that the error correcting ability in the coding process can be improved. However, in this case, since the decoding method varies depending on the encoding method employed in the printing process, the code must include information representing the coding method.

FIGS. 6A and 6B show basic structures of Reed-Solomon codes of ANs, which satisfy the above conditions. The code structures are different in a case where the number of input information symbols to be encoded is 9 or more (FIG. 6A) and in a case where the number is 8 or less (FIG. 6B). Referring to FIG. 6A, one code is a Reed-Solomon code having 13 symbols, including seven information symbols and six check symbols, and a minimum Hamming distance of 7. It is possible to correct errors in at most three symbols of the 13 symbols of a code. Referring to FIG. 6B, one code is also a Reed-Solomon code having 13 symbols, including five information symbols and eight check symbols, and a minimum Hamming distance of 7. It is possible to correct errors in at most four symbols of the 13 symbols of a code.

In each code, ISn and CSn represent information symbols and check symbols, respectively. L1, L21, L22, L31 and L32 represent bit patterns of predetermined additional symbols.

Information representing the coding method is contained in the leftmost symbol of a coding word AN2 in both FIGS. 6A and 6B. The left most symbols of AN2 in FIGS. 6A and 6B are respectively L1=0101 and L31+L32=1010. In a decoding process, the symbol of this position in AN2 is examined, so that the information relating to the encoding method can be obtained. If the number of information symbols to be coded is less than 13 in the case of FIG. 6A, the remainder sections are filled with the null code. The same applies to the case of FIG. 6B.

The shuffling unit 23 has a shuffling function for printing as a bar code the encoded PC and AN, as shown in FIGS. 5, 6A and 6B. The shuffling function is a characteristic feature of the present invention. The symbol/bar code converting unit 24 converts shuffled PC AN to bar codes. The start/stop code adding unit 25 add special bar codes to start and end portions of the shuffled PC and AC.

FIG. 7 shows a result of shuffling the coded PC shown in FIG. 5. As shown in FIG. 7, each check symbol CS is sandwiched between two information symbols ISs. The shuffling process has the following meaning. Each information symbol IS consists of two bars. Referring to FIGS. 4A and 4B, at least one of the two bars of the information symbol IS has a print. However, this does not apply to check symbols CS: a check symbol CS may be 0000. By inserting a check symbol CS between two information symbols ISs, a section with no bars is limited to a certain length. In this embodiment, the number of elements with no bars, which are consecutively arranged, is limited to at most four. If check symbols CSs are consecutively arranged, the section with no bars may be very long. In this case, when the velocity of transferring mails vary, an increase of the length of the section with no bars increases the probability of an error in measuring how long the section with no bars is, i.e., how many bars correspond to the length of the section with no bars. As a result, pull out may occur in a middle portion of a coded word. It lowers the ratio of correctly reading the address and post codes on the mails.

FIG. 8A shows the result of shuffling coded AN1 and AN2 as shown in FIG. 6A. The rule of the shuffling is the same as that in the case of PC.

The rule of shuffling the symbols as shown in FIG. 8B is not the same as that in the case of PC or the case of FIG. 6B. Since the number of information symbols is much less than that of check symbols, the simple shuffling rule of the above two cases cannot apply to this case.

In the printing process, the following conditions are required: a start code consisting of a long bar should be printed prior to CS11 of AN1, CS21 of AN2 should follow CS18, and a stop code or stop continue code consisting of a long bar should be printed after CS28.

In this case, as in the case of PC, the number of continuous bar code elements with no bars is limited to at most four.

Figure 10:
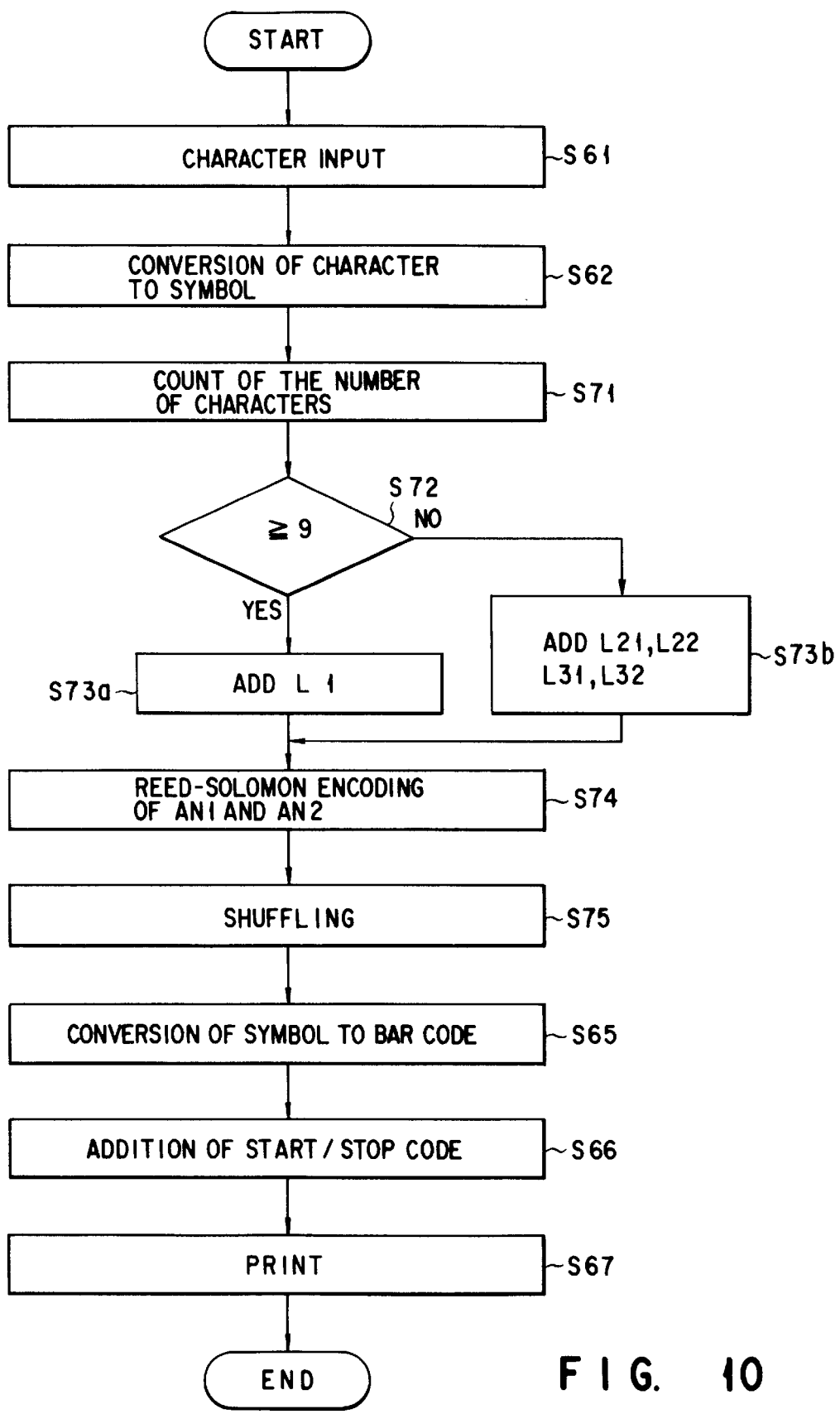
FIG. 10 is a flowchart showing a process of printing an AN code according to the above embodiment.

FIGS. 9 and 10 are flowcharts showing processes from inputting a character to printing a PC and an AN according to the above embodiment. The flowchart of the process of printing an AN code clearly shows that the way of adding an additional symbol, the coding method, and the shuffling rule are different depending on the number of input characters. The printing process is executed with an ink jet printer or the like. The other processes may be executed by either software or hardware.

FIG. 9 is a flowchart showing a process of printing a PC code.

In Step S61, a character, represented by the known ASCII code, is input.

In Step S62, the character represented by the ASCII code is converted to a symbol represented by four bits. If the character is a Roman letter, the letter is first converted to a control code plus a numeral, and then, the control code and the numeral are respectively converted to the corresponding symbols. The rule of converting a character to a symbol is described before, referring to FIGS. 4A and 4B, which show the relationship between the character and the bit pattern. For example, if an ASCII code corresponding to "0" is input, a symbol having a bit pattern "0001" is output in Step S62.

In Step S63, a series of symbols (IS1–IS7 shown in FIG. 5) output in Step S62 is subjected to Reed-Solomon coding, thereby calculating a series of check symbols (CS1–CS6 shown in FIG. 5).

Step S64 is a shuffling step for converting arrangement as shown in FIG. 5 to the arrangement as shown in FIG. 7.

In Step S65, an output from Step S64 is converted to bar code pattern information to be printed. This conversion corresponds to the conversion from the bit patterns as shown in FIGS. 4A and 4B to a bar code. For example, the symbol having the bit pattern "0001" is printed as a bar code having a first element with no bar and a second element with a lower half bar. The bar code pattern information output from Step S65 is used to control a bar code printer in Step S67, so that printing of the bar code is achieved. In the actual printing process, a start code and a stop code are respectively added to the start and end portions of the PC code shown in FIG. 7. The printer control for this purpose is executed on the basis of an output from the Step S66.

FIG. 10 is a flowchart showing a process of printing an AN code. In FIG. 10, the steps of the same contents as those shown in FIG. 9 are identified with the same numerals as used in FIG. 9.

In Step S61, a character, represented by the known ASCII code, is input.

In Step S62, the character represented by the ASCII code is converted to a symbol represented by four bits. If the character is a Roman letter, the letter is first converted to a control code plus a numeral, and then, the control code and the numeral are respectively converted to the corresponding symbols. The rule of converting a character to a symbol is described before, referring to FIGS. 4A and 4B, which show the relationship between the character and the bit pattern. For example, if an ASCII code corresponding to "0" is input, a symbol having a bit pattern "0001" is output in Step S62.

As described before, in the process of printing an AN code, the coding method and the shuffling rule are different depending on the number of symbols of the addresses to be coded. In Step S71, therefore, the number of symbols of an address to be coded is counted. When a character is a numeral or a hyphen, it is represented by one symbol. When a character is a Roman letter, it is represented by two symbols. In Step S71, the number of symbols used to represent the address written on a piece of mail is counted. In Step S72, it is determine whether the number of symbols is nine or greater, or eight or smaller.

In the former case, L1 is added to the symbols in Step S73a, and in the latter case, L21, L22, L31 and L32 are added to the symbols in Step S73b. As a result, all the portions except for the check symbols of the AN code shown in FIG. 6 are completed.

If the number of symbols is nine or greater and smaller than 13, or if the number is smaller than eight, blank sections are filled with the null code shown in FIG. 4B. If the number of symbols representing the address is nine or greater, information symbols IS1–IS13 are determined. If the number of the symbols is less than eight, information symbols IS1–IS8 are determined.

Step S74 will now be described. If the number of symbols representing the address is nine or greater, the Reed-Solomon encoding as shown in FIG. 6A is executed, thereby generating codes AN1 and AN2, each having 13 symbols including six check symbols. On the other hand, if the number of symbols representing the address is eight or smaller, the Reed-Solomon encoding as shown in FIG. 6B is executed, thereby generating codes AN1 and AN2, each having 13 symbols including eight check symbols.

In Step S75, if the number of symbols representing the address is nine or greater, the symbol arrangement as shown in FIG. 6A is converted to the arrangement as shown in FIG. 8A: the shuffling is executed. In this case, the rule of shuffling AN1 is the same as in the case of AN2. If the number of symbols representing the address is eight or smaller, the symbol arrangement as shown in FIG. 6B is converted to the arrangement as shown in FIG. 8B: the shuffling is executed. In this case, the rule of shuffling AN1 is not the same as in the case of AN2.

In Step S65, an output from Step S75 is converted to bar code pattern information to be printed. This conversion corresponds to the conversion from the bit patterns as shown in FIGS. 4A and 4B to a bar code. For example, the symbol having the bit pattern "0001" is printed as a bar code having a first element with no bar and a second element with a lower half bar. The bar code pattern information output from Step S65 is used to control a bar code printer in Step S67, so that printing of the bar code is achieved. In the actual printing process, AN1 and AN2 are directly connected to each other both in the cases of FIGS. 8A and 8B, and a start code and a stop code are respectively added to the start and end portions of the connected code. The printer control for this purpose is executed on the basis of an output from the Step S67.

Figure 11:
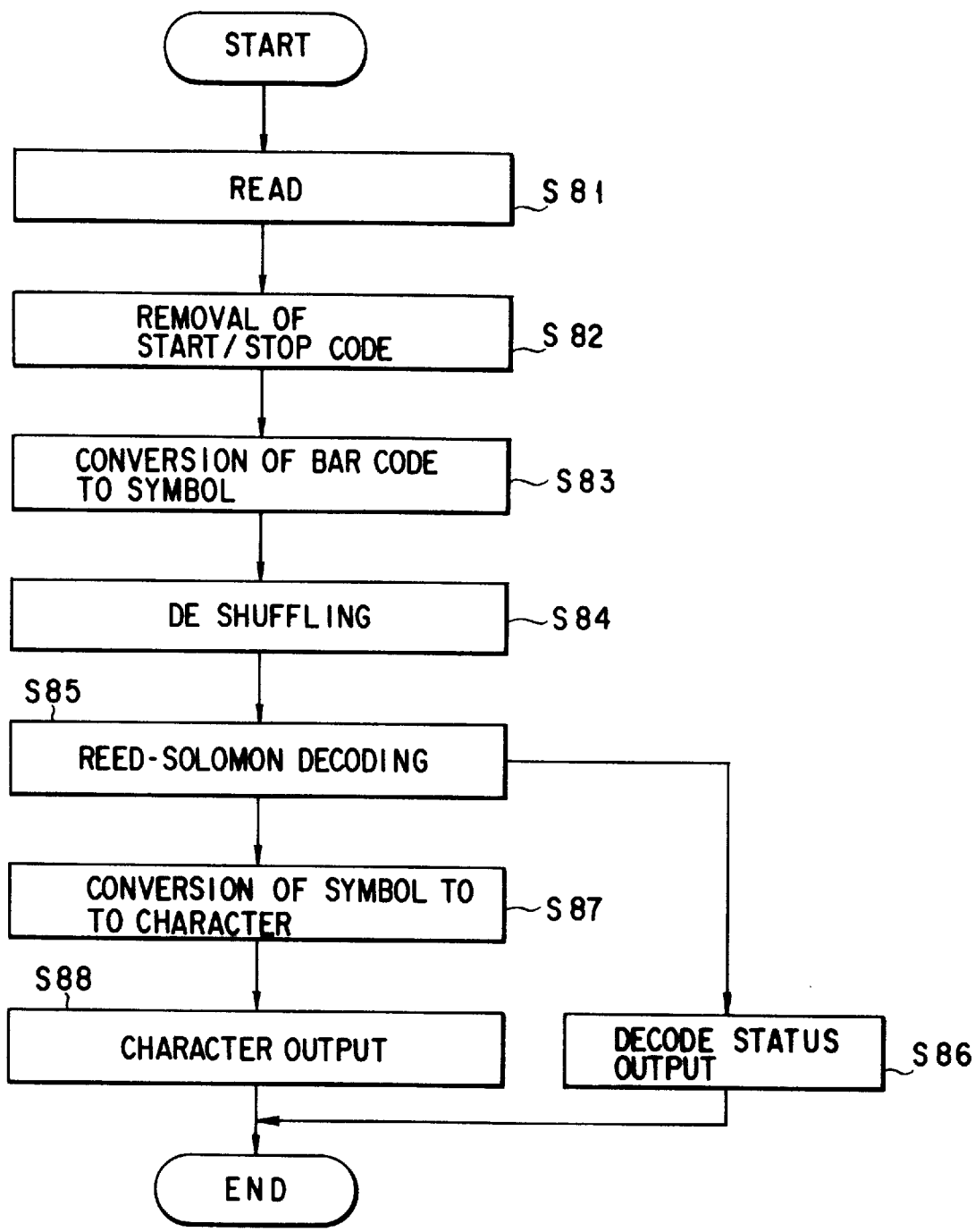
FIG. 11 is a flowchart showing a process of reading a PC code according to the above embodiment.

FIG. 11 is a flowchart showing a process of reading a PC code printed through the process shown in the flowchart of FIG. 9. The flowchart shows the process from a step of optically reading a PC bar code on the mail to a step of decoding the bar code to character information corresponding to the PC.

In Step S81, a bar code on the mail is detected as an optical signal which is intensity-modulated in accordance with the position. The optical signal is converted to a binary value based on the intensity, i.e., a function on the position. As a result, a binary figure pattern is obtained. Then, a pattern of the bar code, which is considered to be printed, is obtained through a pattern recognizing process with respect to the figure pattern..

Information output from Step S81 represents the state of the detected bar code (one of the four states: a long bar, an upper half bar, a lower half bar and a non-bar).

In Step S82, the range of a PC code is discriminated from the series of bar codes detected as described above. The start code and the stop code, having a specific bar shape (e.g., both are long bars), are printed in specified regions with a predetermined distance therebetween. Based on the information on these codes, the start and the stop codes are discriminated from the detected bar code and can be removed from the object of the subsequent process.

Step S83 corresponds to a reverse process of Step S65 (conversion of a symbol to a bar code) shown in FIG. 9.

More specifically, the detected series of bar codes output from Step S82 is sectioned into bar codes, each representing one character (a section containing no bars is interpreted as "one non-bar"). It is examined to what symbol each sectioned bar code pattern corresponds, in accordance with the rule shown in FIGS. 4A and 4B. Then, the detected series of bar codes are converted to a series of symbols.

Step S84 corresponds to a reverse process of Step S64 (shuffling) shown in FIG. 9. More specifically, the arrangement of the series of symbols output from Step S83, as shown in FIG. 7, is converted to the arrangement as shown in FIG. 5. The result of Step S84 is subjected to Step S85 for decoding a Reed-Solomon code.

In Step S85, a PC code is subjected to a known Reed-Solomon decoding process for correcting at most three errors. As a result of the decoding process in Step S85, if it is determined that an error is correctable, a code in which the error has been corrected is output; alternatively, if there is no error or it is determined that an error is not correctable, an input code is output without correction. Actually, the decoding system has a port or variable for outputting a code series and another port or variable for outputting flag information representing the status of the code series. In general, it is determined that the error is not correctable, when inconsistency is found in the process of decoding; for example, when character information is decoded to a symbol of "0000" or when it is concluded that the error is located at a position beyond the length of the code. Further, the following cases are also detected as inconsistency: a breach of rule, such as decoding of a PC to a symbol corresponding to a Roman character (if no Roman character is used in the PC), disorder of the null code, and continuity of the control codes except for the null code.

In Step S87, the decoded symbols are converted to the corresponding characters in accordance with the rule shown in FIGS. 4A and 4B. This process corresponds to a reverse process of Step S62 shown in FIG. 9.

In Step S86, the flag information obtained from Step S85 is interpreted. The information, decoded in Step S85 and converted as the character in Step S87, is evaluated. More specifically, when the flag information represents existence of an uncorrectable error, the decoded information is not reliable and the mail is stored as rejected mail. The addresses written on the rejected mails must be read by a staff later, thereby sorting the mails. When the flag information represents the other status (no error or existence of a correctable error), the decoded information is effective. In this case, the mail is transferred by, for example, an automatic address sorter, through a belt or the like, to a storage box corresponding to the address represented by the decoded information, and stored therein.

Figure 12:
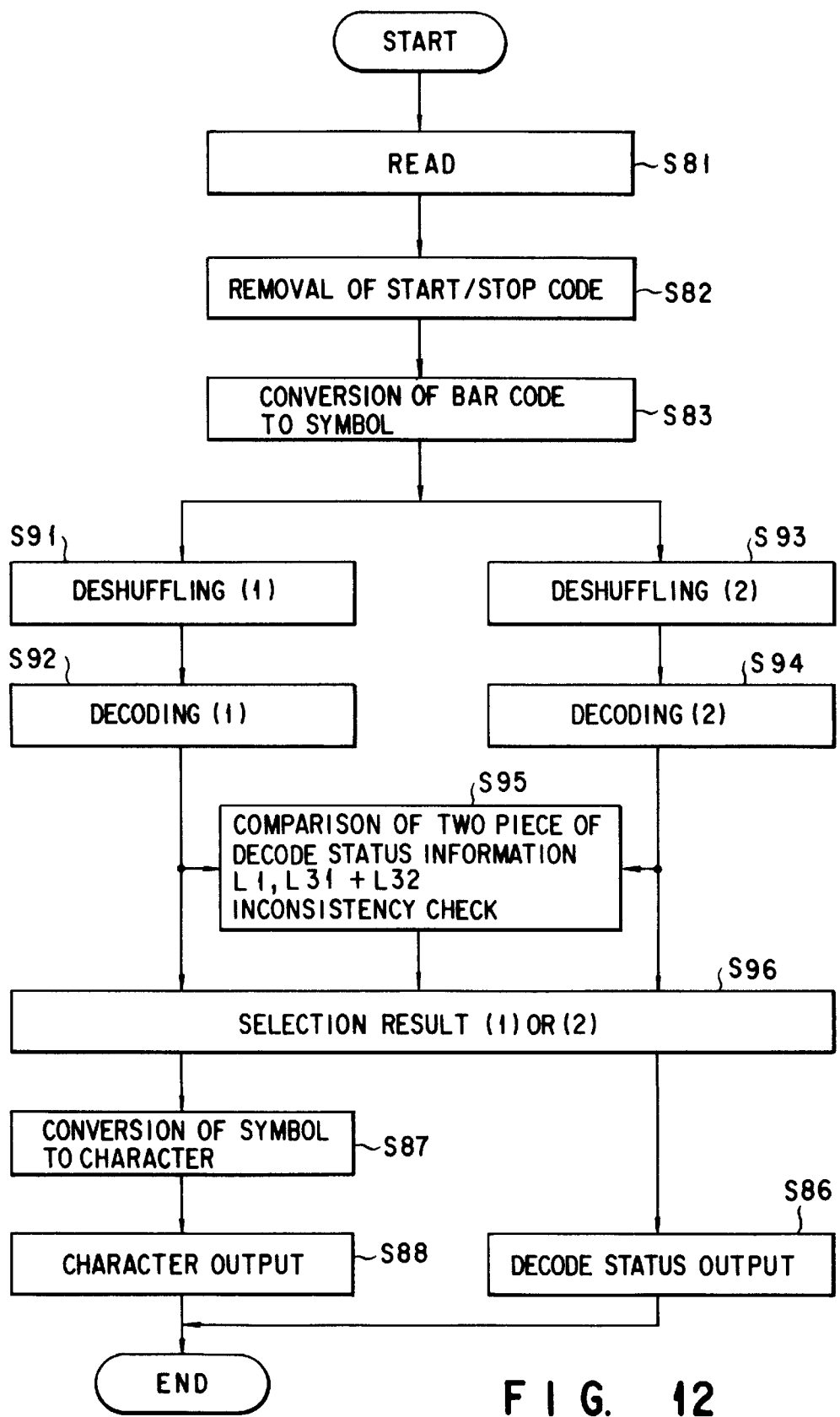
FIG. 12 is a flowchart showing a process of reading an AN code according to the above embodiment.

FIG. 12 is a flowchart showing a process of reading an AN code printed through the process shown in the flowchart of FIG. 10. The flowchart shows the process from a step of optically reading an AN bar code on the mail to a step of decoding the bar code to character information corresponding to the AN.

In Step S81, a bar code on the mail is detected as an optical signal which is intensity-modulated in accordance with the position. The optical signal is converted to a binary value based on the intensity, i.e., a function on the position. As a result, a binary figure pattern is obtained. Then, a pattern of the bar code, which is considered to be printed, is obtained through a pattern recognizing process with respect to the figure pattern.

Information output from Step S81 represent the state of the detected bar code (one of the four states: a long bar, an upper half bar, a lower half bar and a non-bar).

In Step S82, the range of an AN code is discriminated from the series of bar codes detected as described above. The start code and the stop code, having a specific bar shape (e.g., both are long bars), are printed in specified regions with a predetermined distance therebetween. Based on the information on these codes, the start and the stop codes are discriminated from the detected bar code and can be removed from the object of the subsequent process.

Step S83 corresponds to a reverse process of Step S65 (conversion of a symbol to a bar code) shown in FIG. 10. More specifically, the detected series of bar codes output from Step S82 is sectioned into bar codes, each representing one character (a section containing no bars is interpreted as "one non-bar"). It is examined to what symbol each sectioned bar code pattern corresponds, in accordance with the rule shown in FIGS. 4A and 4B. Then, the detected series of bar codes are converted to a series of symbols.

Steps S91 to S96 will be described below. Prior to the description, the process of printing an AN code shown in FIG. 10 should be reviewed. The point is that AN encoding depends on the number of effective characters contained in the address number written on the mail. The encoding process will be described again.

Referring to FIG. 10, Step S71 is a step for counting the number of symbols of an address to be coded. When a character is a numeral or a hyphen, it is represented by one symbol. When a character is a Roman letter, it is represented by two symbols. In Step S71, the number of symbols used to represent the address written on a piece of mail is counted. In Step S72, it is determine whether the number of symbols is nine or greater, alternatively eight or smaller. The flow of the process advances to Step S73a if the number is nine or greater, and to Step S73b if the number is eight or smaller. The processes in Steps S74 and S75 are controlled depending on the number of symbols.

If the number of symbols is nine or greater and smaller than 13, or if the number is smaller than eight, blank sections are filled with the null code shown in FIG. 4B. If the number of symbols representing the address is nine or greater, information symbols IS1–IS13 are determined. If the number of the symbols is less than eight, information symbols IS1–IS8 are determined.

In the former case, L1 is added, and in the latter case, L21, L22, L31 and L32 are added. As a result, all the portions except for the check symbols of the AN code shown in FIGS. 6A and 6B are completed.

Step S74 will now be described. If the number of symbols representing the address is nine or greater, the Reed-Solomon encoding as shown in FIG. 6A is executed, thereby generating codes AN1 and AN2, each having 13 symbols including six check symbols. On the other hand, if the number of symbols representing the address is eighth or smaller, the Reed-Solomon encoding as shown in FIG. 6B is executed, thereby generating codes AN1 and AN2, each having 13 symbols including eight check symbols.

In Step S75, if the number of symbols representing the address is nine or greater, the symbol arrangement as shown in FIG. 6A is converted to the arrangement as shown in FIG. 8A: the shuffling is executed. In this case, the rule of shuffling AN1 is the same as in the case of AN2. If the number of symbols representing the address is eight or smaller, the symbol arrangement as shown in FIG. 6B is converted to the arrangement as shown in FIG. 8B: the shuffling is executed. In this case, the rule of shuffling AN1 is not the same as in the case of AN2.

As described above, the encoding of an AN code is executed in the two methods depending on the number of effective characters in the address number. Steps S91 to S96 constitute a process for decoding the AN code.

The basic principles of the decoding are as follows.

(1) A received code is decoded by two decoding methods corresponding to the two encoding methods.

(2) It is determined which result of the decoding is probable, and a more probable one is adopted as the result of the decoding.

Steps S91 and S92 are a decoding process corresponding to the case in which the number of information symbols is nine or greater.

In Step S91, the arrangement of the series of symbols output from Step S83, as shown in FIG. 8A, is converted to the arrangement as shown in FIG. 6A. The result of Step S91 is subjected to Step S92 for decoding a Reed-Solomon code.

In Step S92, an AN code is subjected to a known Reed-Solomon decoding process for correcting at most three errors. As a result of the decoding process in Step S92, if it is determined that an error is correctable, a code in which the error has been corrected is output; alternatively, if there is no error or it is determined that an error is not correctable, an input code is output without correction. Actually, the decoding system has a port or variable for outputting a code series and another port or variable for outputting flag information representing the status of the code series. In general, it is determined that the error is not correctable, when inconsistency is found in the process of decoding; for example, when character information is decoded to a symbol of "0000" or when it is concluded that the error is located at a position beyond the length of the code. Further, the following cases are also detected as inconsistency: a breach of rule, such as decoding of a PC to a symbol corresponding to a Roman character (if no Roman character is used in the PC), disorder of the null code, and continuity of the control codes except for the null code.

Steps S93 and S94 are a decoding process corresponding to the case in which the number of information symbols is eight or smaller.

In Step S93, the arrangement of the series of symbols output from Step S83, as shown in FIG. 8B, is converted to the arrangement as shown in FIG. 6B. The result of Step S91 is subjected to Step S94 for decoding a Reed-Solomon code.

In Step S94, an AN code is subjected to a known decoding process for correcting at most three errors. As a result of the decoding process in Step S94, if it is determined that an error is correctable, a code in which the error has been corrected is output; or if there is no error or it is determined that an error is not correctable, an input code is output without correction. Actually, the decoding system has a port or variable for outputting a code series and another port or variable for outputting flag information representing the status of the code series. In general, it is determined that the error is not correctable, when inconsistency is found in the process of decoding; for example, when character information is decoded to a symbol of "0000" or when it is concluded that the error is located at a position beyond the length of the code. Further, the following cases are also detected as inconsistency: a breach of rule (if the types of characters used in an address are restricted as in the case of PC), disorder of the null code, and continuity of the control codes except for the null code. Further, as clearly shown in FIGS. 6A and 6B, an AN code includes an additional code, such as L1, having a fixed pattern. Therefore, inconsistency can also be found by confirming whether the additional code is accurately decoded.

In Step S95, the two pieces of decode status information obtained from Steps S92 and 94 are compared with each other, and it is determined which information is probable; i.e., whether the number of information symbols of the AN code is nine or greater, or eight or smaller. In Step S96, controlled by the above determination, a more probable one of the outputs from Steps S92 and S94 is selected to be supplied to a subsequent step.

As described before in connection with Step S92 or S94, the following factors of information are used to determine the probability in Step S95:

(1) the number of detected errors;
(2) the position of detected errors;
(3) whether the character information is "0000";
(4) whether the types of used characters are within the limited range;
(5) whether the position of the null code is appropriate;
(6) whether a control code is inserted in an appropriate position; and
(7) whether an additional code of a fixed pattern is correctly decoded.

In Step S87, the decoded symbols are converted to the corresponding characters in accordance with the rule shown in FIGS. 4A and 4B. This process corresponds to a reverse process of Step S62 shown in FIG. 9.

In Step S86, the flag information obtained from Step S85 is interpreted. The information, decoded in Step S85 and converted as the character in Step S87, is evaluated. More specifically, when the flag information represents existence of an uncorrectable error, the decoded information is not reliable and the mail is stored as rejected mail. The addresses written on the rejected mails must be read by a staff later, thereby sorting the mails. When the flag information represents the-other status (no error or existence of a correctable error), the decoded information is effective. In this case, the mail is transferred by, for example, an automatic address sorter, through a belt or the like, to a storage box corresponding to the address represented by the decoded information, and stored therein.

Figure 13:
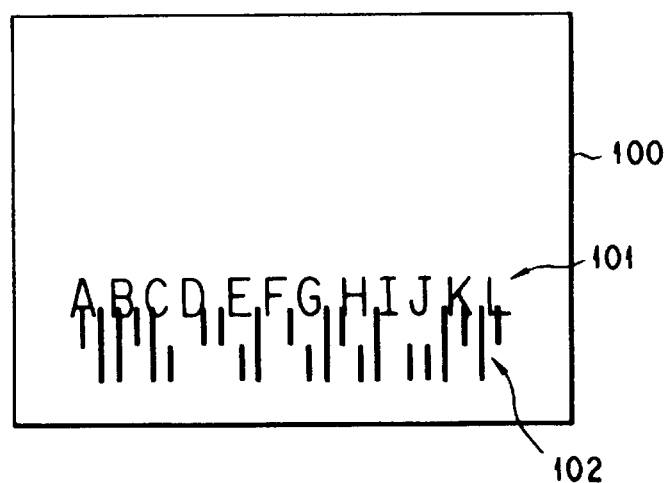
FIG. 13 is a diagram showing the relationship between the address written on a postcard and the four-state bar codes of the present invention.

FIG. 13 shows an example in which a bar code of the present invention is applied to a postcard. Character information 101, such as an address, is written and a bar code 102 according to the present invention are printed on a postcard 100. Even if the bar code printed on the postcard overlaps the characters of the address written by the sender, inconveniences (e.g., failure in reading or erroneous reading of the bar code) can be suppressed to a minimum. As a result, a rereading operation by the operator is not required, and the delivery delay of the mail to the correct address is prevented.

As has been described above in detail, according to the present invention, three or more bar code patterns, corresponding to check symbols, are not consecutively arranged. When two continuous bar code patterns corresponding to check symbols are arranged on a print surface, a bar including a printed portion is printed in either or both of the start and the end portions of the patterns.

As a result, it is ensured that the length of a section in which no bar is present is limited to a predetermined value or less. Therefore, the ability of the Reed-Solomon code for correcting errors can be efficiently utilized, while the reliability of the bar-code recognition is maintained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. Four-state bar codes comprising the combination with:
   a first code element representing a long bar having a predetermined length defined by an upper end, a center and a lower end;
   a second code element representing an upper half bar having a length extending from the upper end to the center;
   a third code element representing a lower half bar having a length extending from the center to the lower end; and
   a fourth code element representing a blank from the upper end to the lower end,
   wherein a numeral is represented by a combination of two of the first to fourth code elements, a control code is represented by a combination of two of the first to fourth code elements, and a Roman letter is represented by a combination of one of a respective numeral and control code.

2. The four-state bar codes according to claim 1, wherein a combination of two of the first to fourth code elements represents one of ten numerals 0–9, a hyphen, a blank and first to third control codes, combinations of the first control code and the ten numerals represent ten Roman letters, combinations of the second control code and the ten numerals represent ten other Roman letters, and combinations of the third control code and six of the ten numerals represent six Roman letters.

3. The four-state bar codes according to claim 1, wherein two of the first to fourth code elements representing a unit character are printed on a piece of mail.

4. A bar code encoding method comprising the steps of:
   representing an input character by an information symbol of m bits excluding a bit pattern of all "0" bits;
   subjecting a series of a k-number of information symbols to error-correction encoding and calculating a check symbol series of a q-number of check symbols;
   respectively converting an n=(k+q) number of symbols to predetermined bar code patterns; and
   converting arrangement of the n-number of symbols so that at most three bar code patterns corresponding to the check symbols may not be consecutively arranged.

5. The bar code encoding method according to claim 4, wherein the arrangement converting step includes a step of, when two bar code patterns corresponding to the check symbols are consecutively arranged, inserting a predetermined bar code before and/or after the two bar code patterns.

6. The bar code encoding method according to claim 4, wherein the calculating step is a Reed-Solomon encoding step.

7. A bar code encoding system comprising:
   representing means for representing an input character by an information symbol consisting of m bits excluding a bit pattern of all "0" bits;
   calculating means for subjecting a series of a k-number of information symbols to error-correction encoding and calculating a check symbol series of a q-number of check symbols;
   converting means for respectively converting an n=(k+q) number of symbols to predetermined bar code patterns; and
   arrangement converting means for converting arrangement of the n-number of symbols so that at most three bar code patterns corresponding to the check symbols may not be consecutively arranged.

8. The bar code encoding system according to claim 7, wherein the arrangement converting means includes means, when two bar code patterns corresponding to the check symbols are consecutively arranged, for inserting a predetermined bar code before and/or after the two bar code patterns.

9. The bar code encoding method according to claim 7, wherein the calculating means is a Reed-Solomon encoding means.

10. A correcting and delivering system comprising:
    a character reader for reading a character written on an object;
    a bar code encoder for encoding the character read from the object by the character reader by using four-state bar codes comprising the combination with: a first code element representing a long bar having a predetermined length defined by an upper end, a center and a lower end; a second code element representing an upper half bar having a length extending from the upper end to the center; a third code element representing a lower half bar having a length extending from the center to the lower end; a fourth code element representing a blank from the upper end to the lower end;
    a character/symbol converting unit for representing an input character by an information symbol of m bits excluding a bit patten of all "0" bits:
    a Reed-Solomon encoding unit for subjecting a series of a k-number of information symbols to Reed-Solomon encoding and obtaining a check symbol series of a q-number of check symbols:
    a shuffling unit for shuffling an n=(k+q) number of symbols so that at most three bar code patterns corresponding to the check symbols may not be consecutively arranged;
    a symbol/bar code converting unit for respectively converting the n-number of symbols to predetermined bar code patterns;
    a start/stop code converting unit for adding a predetermined bar code to start and end portions of the bar code pattern obtained by the symbol/bar code converting unit;
    a printer for printing a bar code encoded by the bar code encoder on the object;
    a bar code reader for reading the bar code printed on the object;
    a decoder for decoding the bar code to restore the bar code read by the bar code reader to the character in accordance with an encoding method used in the bar code encoder; and
    a sorter for sorting the object based on information corresponding to the character restored by the decoder.

11. The collecting and delivering system according to claim 10, wherein the object is mail.

12. A correcting and delivering system comprising:
    a character reader for reading a character written on an object;
    a bar code encoder for encoding the character read from the object by the character reader by using four-state bar codes comprising the combination with: a first code element representing a long bar having a predetermined length defined by an upper end, a center and a lower end; a second code element representing an upper half bar having a length extending from the upper end to the center; a third code element representing a lower half bar having a length extending from the center to the lower end; and a fourth code element representing a blank from the upper end to the lower end, wherein a numeral is represented by a combination of two of the first to fourth code elements, a control code is represented by a combination of two of the first to fourth code elements and a Roman letter is represented by a combination of one of a respective numeral and control code;

a printer for printing a bar code encoded by the bar code encoder on the object;

a bar code reader for reading the bar code printed on the object;

a decoder for decoding the bar code to restore the bar code read by the bar code reader to the character in accordance with an encoding method used in the bar code encoder; and a sorter for sorting the object based on information corresponding to the character restored by the decoder.

13. The collecting and delivering system according to claim 12, wherein the object comprises mail.

* * * * *